United States Patent [19]
Challender

[11] Patent Number: 6,029,319
[45] Date of Patent: Feb. 29, 2000

[54] GARMENT CLIP RECESSED IN EYEGLASSES TEMPLE

[76] Inventor: James R. Challender, 126 NW. 98th Ter., Plantation, Fla. 33324

[21] Appl. No.: 09/296,352

[22] Filed: Apr. 22, 1999

[51] Int. Cl.⁷ .................................................. A44B 21/00
[52] U.S. Cl. ............................. 24/3.12; 24/3.3; 24/3.11
[58] Field of Search .............................. 24/3.3, 3.11, 3.12, 24/49.1

[56] References Cited

U.S. PATENT DOCUMENTS

| | | | |
|---|---|---|---|
| 1,385,009 | 7/1921 | Kopp et al. | 24/3.12 |
| 1,652,972 | 12/1927 | Beck | 24/3.12 |
| 2,097,371 | 10/1937 | Hon . | |
| 2,280,304 | 4/1942 | Schauer | 24/3.11 |
| 3,038,377 | 6/1962 | Maxson | 24/3.12 |
| 4,754,528 | 7/1988 | Lyons et al. | 24/3.12 |
| 4,771,515 | 9/1988 | Guarro | 24/3 C |
| 4,949,432 | 8/1990 | Wisniewski | 24/3.3 |
| 5,216,785 | 6/1993 | Graef | 24/49.1 |
| 5,235,727 | 8/1993 | McCloskey | 24/3 C |
| 5,351,098 | 9/1994 | McDaniels | 351/112 |
| 5,414,906 | 5/1995 | Kren | 24/3.3 |
| 5,491,878 | 2/1996 | Janouschek | 24/3.3 |

*Primary Examiner*—Victor N. Sakran
*Attorney, Agent, or Firm*—Alvin S. Blum

[57] ABSTRACT

A spring biased clip is provided for eyeglasses or eyewear to hold the eyewear securely in a fabric pocket when not in use. The fabric engaging end of the clip is normally held in a recess in the side of the temple where it will not inadvertently snag items, and where it will be inconspicuous. The fabric engaging end of the clip moves outward beyond the surface of the temple when the opposite end of the clip is depressed by a finger. In this position, the clip is easily slipped over the fabric edge of a pocket without applying any force to the fabric. This enables the clip to be provided with a strong spring for securely holding the eyewear.

14 Claims, 2 Drawing Sheets

6,029,319

GARMENT CLIP RECESSED IN EYEGLASSES TEMPLE

BACKGROUND OF THE INVENTION

1. Field of the Invention

This invention relates to means for securely holding eyeglasses on a person when they are not being used, and more particularly to a pocket clip resiliently attached to a temple of an eyeglasses frame for releaseably engaging the edge of a garment, such as a pocket, when not in use.

2. Description of the Prior Art

Spring clips permanently or removeably attached to temples of eyeglasses frames are well known. U.S. Pat. No. 5,414,906 issued May 16, 1995 to Kren reviews the literature. It discloses a mechanism attachable to a temple that protrudes outward therefrom. This presents cosmetic problems, as well as something that can catch on hair or other obstacles that might damage the eyeglasses or injure the wearer. Resilient pocket clips, such as found on pens, have a garment engaging tip end that protrudes from the plane of the pen surface enough to catch on the garment edge. It has an inwardly directed bevel so that the garment edge forces the clip open against the spring bias. The degree of spring bias is a compromise between sufficient strength to hold securely, and weak enough to open when forced against a flimsy garment. Because a spring clip on an eyeglasses, or eyewear frame must hold a considerable weight, and dropping the glasses may represent a great loss of time and money, it must have considerable spring bias. For cosmetic and safety reasons, the clip should not extend beyond the plane of the temple surface when not engaging the garment.

SUMMARY OF THE INVENTION

It is accordingly an object of the invention to provide a garment clip means for a temple that has sufficient spring bias to securely hold the eyewear. It is another object to provide a clip that is visually unobtrusive. It is yet another object that the clip not extend outwardly from the plane of the temple surface when the clip is not in use. It is yet another object that the clip slip readily over the edge of even a very flimsy garment despite having a strong spring bias.

The clip of the invention is recessed below the plane of the surface of the temple, and the free end of the clip is held recessed by spring bias. An end opposite the free end, that may also be recessed, is arranged to be depressed by the user to cause the free end to extend beyond the plane of the temple surface so that it can easily engage a garment, such as the upper edge of a pocket. Because the clip is protruded by finger action of the user against the spring bias, and not by forces on the garment edge, the spring bias may be quite strong and yet permit engagement by flimsy garments without force being applied to the garment during the process of engagement.

These and other objects, features and advantages of the invention will become more apparent when the detailed description is studied in conjunction with the drawings, in which like reference characters indicate like elements in the various drawing figures.

DETAILED DESCRIPTION OF PREFERRED EMBODIMENTS

Figure 1:
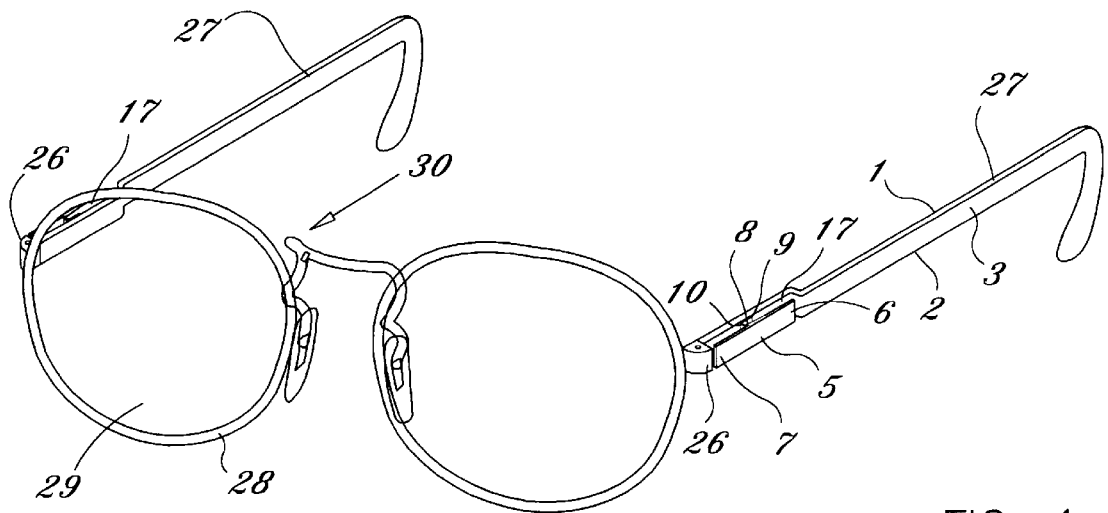
FIG. 1 is a perspective view of an eyewear frame with spring clip of the invention recessed in the temple.
Figure 2:
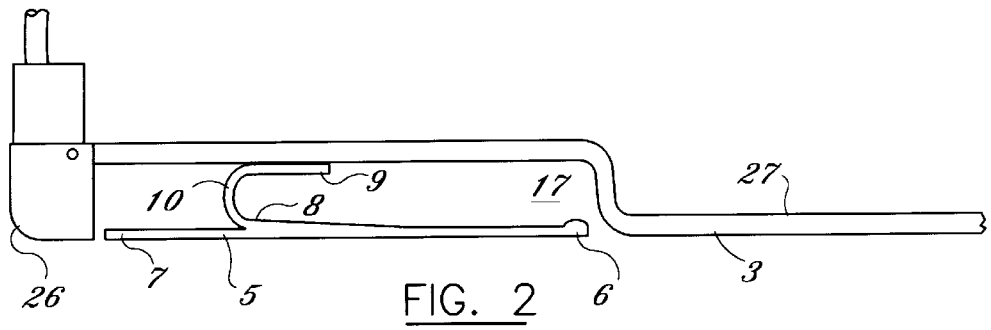
FIG. 2 is a top view of the apparatus of FIG. 1 with clip closed.
Figure 3:
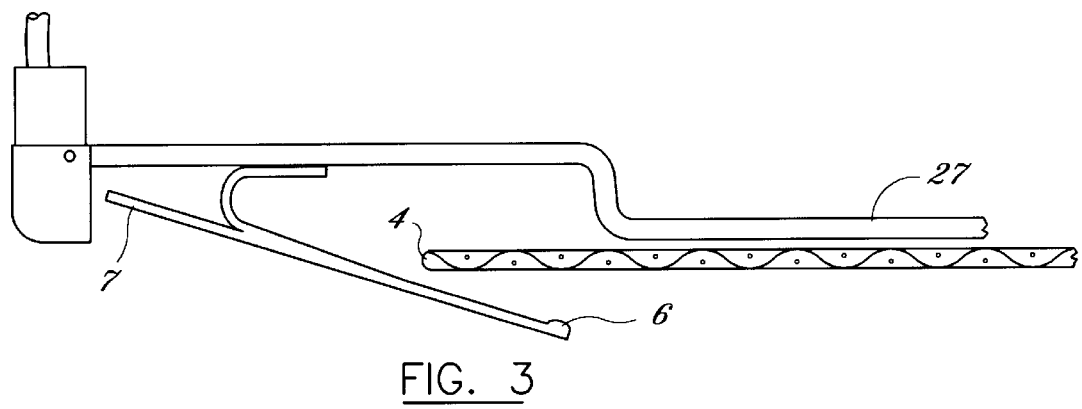
FIG. 3 is a top view as in FIG. 2 with clip open.

Referring now first to FIGS. 1–3, an eyewear 30 has a lens frame 28 holding lenses 29 in a conventional structure, with temples 27 attached to the frame by temple hinges 26. Each temple has a top surface 1, a bottom surface 2, and a lateral outside surface 3 provided with a recess 17 without sides. Mounted within recess 17 is a clip 5 molded of a transparent resilient plastic. The clip has a fabric engaging first end 6, and a second end 7. A U shaped spring member 10 that may be molded integral with the clip 5 is attached to the clip intermediate the ends, and is also attached to the temple in the recess to serve as a fulcrum. When the second end 7 is depressed by a finger, the first end 6 moves in the opposite direction, as shown in FIG. 3. It extends beyond the plane of temple surface 3 so that fabric edge 4 of a pocket may be easily slipped between the temple and the clip without any force being applied to the fabric. When the end 7 is released, spring bias forces end 6 tightly against the fabric, thereby securely holding the eyewear in place.

When the clip is formed of a transparent material, it is virtually invisible both when the glasses are in use or in the pocket. Alternatively, the clip and/or the spring may be made of other materials, such as titanium, for example.

Figure 4:
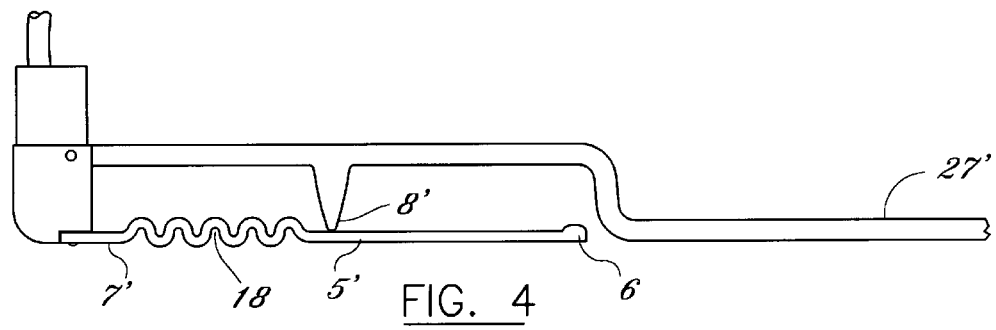
FIG. 4 is a top view of another embodiment of the invention.

Referring now to FIG. 4, another embodiment of the invention is shown in which the fulcrum 8' is attached to the temple 27'. A resilient strip of metal forms clip 5', which is attached to the temple 27' at its second end 7'. Corrugations 18 may be provided to facilitate inward movement of end 7' when depressed. The resilience of the metal clip serves as the spring bias to hold end 6' tightly against the temple.

Figure 5:
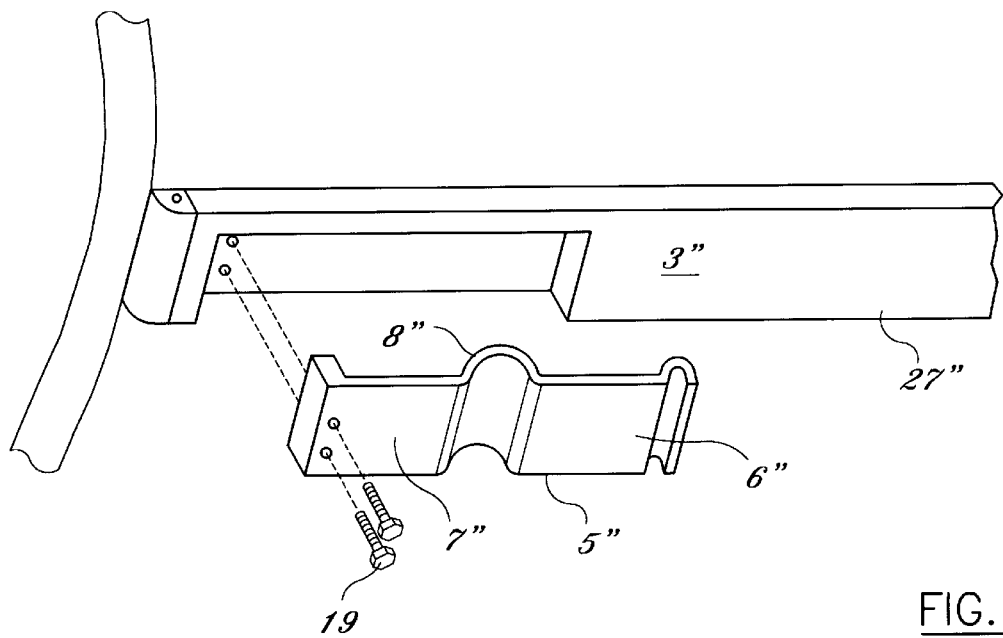
FIG. 5 is an exploded view of another embodiment of the invention.

Referring now to FIG. 5, another embodiment of the invention is shown in which a resilient titanium strip 5" serving as the clip has a bend 8" which serves as a fulcrum. The clip 5" is mounted in recess 16 of temple 27" by rivets 19. When second end 7" is depressed, first end 6" is forced out beyond the plane of lateral outside surface 3" of the temple to readily engage a pocket without applying any force to the fabric to open the clip. Spring bias keeps the end 6" below the plane of surface 3" when the end 7" is not depressed so that in is unobtrusive and cannot inadvertently snag items.

The above disclosed invention has a number of particular features which should preferably be employed in combination, although each is useful separately without departure from the scope of the invention. While I have shown and described the preferred embodiments of my invention, it will be understood that the invention may be embodied otherwise than herein specifically illustrated or described, and that certain changes in form and arrangement of parts and the specific manner of practicing the invention may be made within the underlying idea or principles of the invention.

What is claimed is:

1. Apparatus for securing eyewear to clothing of an eyewear user when said eyewear is not in use, wherein said eyewear includes lenses, lenses frame, and temples hingedly attached to said lenses frame, each temple having a top surface, a bottom surface, and an outside lateral surface, and wherein said clothing has a fabric edge, the apparatus comprising:

an elongate clip having a fabric-edge-engaging first end, and a second end;

a fulcrum means releasably affixed to the temple of said eyewear positioned intermediate the first and second ends for causing the first and second ends to move in opposite directions;

mounting means for movably mounting the clip on the lateral surface of one of the temples so as to have two operating positions; a first position in which the first end is disposed at a level that does not extend above the lateral surface of the temple immediately adjacent the end so as to avoid inadvertent catching on obstacles and for cosmetic unobtrusiveness; and a second position in which the first end protrudes beyond the level of the lateral surface of the temple immediately adjacent the end so as to facilitate engagement of the fabric edge;

spring bias means for urging the clip to the first position when the eyewear is being worn and for firmly gripping the fabric edge when the eyewear is not in use; and means for forcing the clip to the second position against the spring bias by application of pressure by the user on the second end to facilitate securing the eyewear to the clothing.

2. The apparatus according to claim 1, in which the fulcrum means releasably affixed to the clip.

3. The apparatus according to claim 1, in which the clip is comprised of a resilient transparent plastic material.

4. The apparatus according to claim 1, in which the clip is comprised of a resilient plastic material.

5. The apparatus according to claim 1, in which the clip is comprised of a resilient metal.

6. The apparatus according to claim 1, in which the clip is comprised of titanium.

7. The apparatus according to claim 1, in which the clip is mounted in a recess in the outside lateral surface of the temple.

8. Apparatus for securing eyewear to clothing of an eyewear user when said eyewear is not in use, wherein said eyewear includes lenses, lenses frame, and temples hingedly attached to said lenses frame, each temple having a top surface, a bottom surface, and an outside lateral surface, and wherein said clothing has a fabric edge, the apparatus comprising:

a recess in the outside lateral surface of one of the temples, the recess being without sides;

an elongate clip having a fabric-edge-engaging first end, and a second end;

a fulcrum means positioned intermediate the first and second ends for causing the first and second ends to move in opposite directions;

mounting means for movably mounting the clip in the recess on one of the temples so as to have two operating positions, a first position in which the first end is disposed at a level that does not extend above the lateral surface of the temple immediately adjacent the end so as to avoid inadvertent catching on obstacles and for cosmetic unobtrusiveness, and a second position in which the first end protrudes beyond the level of the lateral surface of the temple immediately adjacent the end so as to facilitate engagement of the fabric edge;

spring bias means for urging the clip to the first position when the eyewear is being worn and for firmly gripping the fabric edge when the eyewear is not in use; and means for forcing the clip to the second position against the spring bias by application of pressure by the user on the second end to facilitate securing the eyewear to the clothing.

9. The apparatus according to claim 8, in which the fulcrum means is affixed to the temple.

10. The apparatus according to claim 8, in which the fulcrum means is affixed to the clip.

11. The apparatus according to claim 8, in which the clip is comprised of a resilient transparent plastic material.

12. The apparatus according to claim 8, in which the clip is comprised of a resilient plastic material.

13. The apparatus according to claim 8, in which the clip is comprised of a resilient metal.

14. The apparatus according to claim 8, in which the clip is comprised of titanium.

* * * * *